United States Patent
Mohan et al.

(10) Patent No.: US 11,415,241 B2
(45) Date of Patent: Aug. 16, 2022

(54) VALVE FOR A BIOPROCESS LIQUID

(71) Applicant: Cytiva Sweden AB, Uppsala (SE)

(72) Inventors: Prashanth Hosabettu Mohan, Bangalore (IN); Ajit S. Vernekar, Bangalore (IN); Praveen Paul, Bangalore (IN); Krishnadev Madhavan Nair, Bangalore (IN); Manjunath Bhat, Bangalore (IN)

(73) Assignee: Cytiva Sweden AB, Uppsala (SE)

( * ) Notice: Subject to any disclaimer, the term of this patent is extended or adjusted under 35 U.S.C. 154(b) by 0 days.

(21) Appl. No.: 17/259,709

(22) PCT Filed: Jul. 19, 2019

(86) PCT No.: PCT/EP2019/069465
§ 371 (c)(1),
(2) Date: Jan. 12, 2021

(87) PCT Pub. No.: WO2020/016396
PCT Pub. Date: Jan. 23, 2020

(65) Prior Publication Data
US 2021/0140558 A1   May 13, 2021

(30) Foreign Application Priority Data

Jul. 17, 2018  (IN) .............................. 201841026672

(51) Int. Cl.
*F16K 31/06* (2006.01)
*F16K 11/24* (2006.01)

(52) U.S. Cl.
CPC .......... *F16K 31/0606* (2013.01); *F16K 11/24* (2013.01); *F16K 31/0627* (2013.01); *F16K 31/0631* (2013.01); *F16K 31/0679* (2013.01)

(58) Field of Classification Search
CPC ............. F16K 31/0606; F16K 31/0627; F16K 31/0631; F16K 31/0679; F16K 11/24
See application file for complete search history.

(56) References Cited

U.S. PATENT DOCUMENTS 2,366,412 A   1/1945  Lambert
2,605,785 A * 8/1952  Ellsworth ............... F16K 11/24
                                                        251/129.2
(Continued)

FOREIGN PATENT DOCUMENTS

EP   2758695 B1   11/2015
EP   2831474 B1    2/2019
(Continued)

OTHER PUBLICATIONS

PCT International Search Report and Written Opinion for PCT/EP2019/069465 dated Oct. 30, 2019 (12 pages).

*Primary Examiner* — Umashankar Venkatesan
(74) *Attorney, Agent, or Firm* — Eversheds Sutherland (US) LLP

(57) ABSTRACT

A valve (100) for a bioprocess liquid apparatus (199) comprises tubular sections (101, 102, 103) inside which valve seat means (155) are arranged. A plunger arrangement (150) is configured to selectively interact with the valve seat means to close and open the tubular sections in response to a magnetic field provided by solenoid arrangements (104, 105), the solenoid arrangements being arranged at the bioprocess liquid apparatus. A flow path device comprising such a valve and a bioprocess liquid apparatus and a method of handling a bioprocess liquid are also disclosed.

8 Claims, 3 Drawing Sheets

(56) References Cited

U.S. PATENT DOCUMENTS

| | | | |
|---|---|---|---|
| 3,552,437 A | | 1/1971 | Blosser, Jr. et al. |
| 4,293,413 A | * | 10/1981 | Schnell ............... A61M 1/3627 |
| | | | 210/188 |
| 5,441,232 A | * | 8/1995 | Tanaka ................ F16K 31/0658 |
| | | | 251/129.05 |
| 5,711,347 A | | 1/1998 | Sturman et al. |
| 6,837,257 B2 | * | 1/2005 | Cedergren .............. F16K 31/08 |
| | | | 137/113 |
| 2017/0057805 A1 | | 3/2017 | Bischel |
| 2020/0063876 A1 | * | 2/2020 | DeSalvo ................. G06F 3/014 |

FOREIGN PATENT DOCUMENTS

| | | | |
|---|---|---|---|
| GB | 208703 | 7/1924 | |
| NL | 1009009 C2 * | 9/1999 | ......... F16K 31/0627 |
| WO | 2004/024383 A1 | 3/2004 | |

\* cited by examiner

VALVE FOR A BIOPROCESS LIQUID

CROSS REFERENCE TO RELATED APPLICATIONS

This application claims the priority benefit of PCT/EP2019/069465, filed on Jul. 19, 2019, which claims the benefit of Indian Application No. 201841026672, filed on Jul. 17, 2018, the entire contents of which are incorporated by reference herein.

TECHNICAL FIELD

Embodiments herein relate to a valve, a flow path device comprising such a valve, a bioprocess liquid apparatus comprising such a valve and a method of handling a bioprocess liquid.

BACKGROUND

In the bioprocess industry, biopharmaceuticals such as therapeutic antibodies, vaccine antigens, gene therapy vectors etc are expressed in biological organisms and processed in multiple steps to obtain the final purified biopharmaceutical. These steps usually involve cell cultivation, cell separation, filtration and one or more chromatography steps, where bioprocess liquids are handled in each step. Bioprocess liquids are typically in the form of cell cultures, either during or after cultivation or after different previous treatments, e.g. lysis, homogenization, clarification and/or partial purification. A system or an apparatus for handling bioprocess liquids typically comprises various types of containers and processing means that are interconnected with tubular means. Needless to say, valves that are arranged along the tubular means are essential parts of such a system or apparatus for enabling flow control of the bioprocess liquid. For example, flow control may involve mixing of two different liquids into one mixed liquid.

The bioprocess industry is more and more turning towards single-use process components, such as supported plastic bags for liquid containment and flexible tubing single-use flow-paths for conveying liquids. Prior art systems and apparatuses for handling bioprocess liquids typically utilize pinch valves for so-called on/off control of liquid flow and in many cases also diaphragm valves for more accurate flow control. In addition to being bulky, pinch valves are also associated with a drawback known as "dead legs". A "dead leg" is the stagnant segment of a flow path just before a pinch valve. This segment is usually unavoidable in the normal tubular flow kits, due to the connectors and the size of the pinch valves. A general issue or drawback with dead legs is cross-contamination and carry-over when different liquids are conveyed through the system, e.g. when a chromatography elution buffer passes the flow path and is contaminated by stagnant residues of another buffer previously supplied through a branch in the flow path. In bioreactor systems, a particular issue with dead legs is that cells present in a dead leg will grow under different (worse) conditions than the cells in the main bioreactor vessel. Such cells may release signal substances that can affect the performance of the entire cell culture.

Attached FIG. 1 illustrates an example of a detail of an apparatus for handling bioprocess liquids that utilizes two pinch valves 21, 22 arranged along a respective tube 11, 12. A dead leg section 15 is illustrated.

SUMMARY

In view of the above, an object of the present disclosure is to overcome or at least mitigate at least some of the drawbacks related to prior art handling of bioprocess liquids.

This is achieved in a first aspect by a valve for a bioprocess liquid apparatus. The valve comprises a first tubular section, a second tubular section and a third tubular section. Each tubular section has a respective first end and a respective second end. The tubular sections are joined together at their respective second end. Valve seat means are arranged at least at the respective second end inside the first tubular section and inside the second tubular section. A plunger arrangement is arranged inside the valve. The plunger arrangement is configured to selectively interact with the valve seat means to close and open at least the first tubular section and the second tubular section in response to a magnetic field provided by a first solenoid arrangement arranged at the second end of the first tubular section and a magnetic field provided by a second solenoid arrangement arranged at the second end of the second tubular section.

In other words, such a valve comprises tubular connection branches that connect to each other to form a valve outer body, inside which there are valve seats. The valve seats co-operate with a plunger arrangement to close and open flow of liquid through the valve and through the tubular connection branches. Actuation of the valve (i.e. actuation of the plunger arrangement) is made through solenoid arrangements, e.g. in the form of induction coils, arranged externally over the valve. The plunger arrangement preferably comprises a ferrite material that is capable of interaction with magnetic fields provided by the solenoid arrangements.

Embodiments of such a valve have an advantage in that they are simple in construction and may be provided as single use devices. Single use is an important feature in many contexts involving bioprocess liquids in that contamination and undesired degradation of bioprocess material can be avoided. Simplicity in constructional details and ease of use are factors that minimize cost in such single use scenarios. An important advantage of (pre-sterilized) single-use flow paths and vessels in bioprocess applications is that costly cleaning and sterilization operations between batches/campaigns are not needed. It also significantly decreases the regulatory burden, as validation of cleanliness/sterility is not needed. From a regulatory perspective, single-use wetted surfaces also allow the possibility to use one process line for production of several different biopharmaceuticals. This is not possible with conventional stainless steel equipment.

In some embodiments of the valve, the plunger arrangement comprises a first plunger arranged at the second end inside the first tubular section and a second plunger arranged at the second end inside the second tubular section. In such embodiments, the first plunger and the second plunger are connected with each other via a connecting part and configured such that closure of the first tubular section corresponds to opening of the second tubular section.

In other embodiments, the plunger arrangement comprises a first plunger arranged at the second end inside the first tubular section and a second plunger arranged at the second end inside the second tubular section. In such embodiments, the first plunger and the second plunger are suspended by respective support means that are arranged inside the valve. In such embodiments, opening and closure of the tubular sections may be combined such that any one or both tubular sections may be open or closed at the same time.

The support means may in various embodiments comprise springs, preferably attached to the inside wall of the valve, that may provide a biasing spring force on the plungers either towards or away from the valve seat means. When a magnetic field is provided by the solenoid arrangements, the biasing force will be overcome and the plungers will be forced away from or towards the valve seat means.

In some embodiments, any of the first solenoid arrangement and the second solenoid arrangement may comprise a double coil arrangement. In such embodiments, the support means may be fixed and a biasing force on the plungers, either towards or away from the valve seat means, may be provided by a first coil. A second coil, when activated, may then provide a force that moves the plungers away from or towards the valve seat means. In other words, a double coil arrangement enables opening and closing of each plunger by magnetic fields selectively provided by the first coil and the second coil.

In some embodiments, the plunger arrangement comprises a single plunger arranged inside the valve such that closure of the first tubular section corresponds to opening of the second tubular section. That is, in such embodiments, the single plunger may be controlled to move between the tubular sections and their respective valve seat means and thereby selectively open and close any one tubular section at a time.

In some embodiments, the plunger arrangement comprises a single plunger arranged inside the valve such that, in response to the magnetic field provided by the first solenoid arrangement, the magnetic field provided by the second solenoid arrangement and a magnetic field provided by a third solenoid arrangement arranged at the second end of the third tubular section, the single plunger selectively interacts with the valve seat means to close and open the first tubular section, the second tubular section and the third tubular section. In such embodiments, the third solenoid arrangement enables a scenario in which both the first and the second tubular sections are open at the same time. Depending on whether valve seat means are arranged at the third tubular section, the single plunger may be selectively controlled to be in a position that closes the third tubular section or a more "neutral" position that allows liquid flow also in the third tubular section.

In a second aspect there is provided a flow path device for a bioprocess liquid that comprises at least one valve according to any embodiment as summarized above, and a plurality of tubes attached to the valve. Such a flow path device may comprise a plurality of connectors configured to connect the flow path device to a bioprocess liquid apparatus. Any of the tubes, the at least one valve and the connectors may be aseptic.

Embodiments of such a flow path device have an advantage in that they are simple in construction and may be provided as single use devices. Single use is an important feature in many contexts involving bioprocess liquids in that contamination and undesired degradation of bioprocess material can be avoided. Moreover, simplicity in constructional details and ease of use are factors that minimize cost in such single use scenarios.

In a third aspect there is provided a bioprocess liquid apparatus that comprises control circuitry, a first solenoid arrangement and a second solenoid arrangement. Optionally the apparatus may comprise a third solenoid arrangement. The apparatus is configured to interact with at least one valve according to any embodiment as summarized above, the interaction comprising provision of magnetic fields to a plunger arrangement inside the valve.

Embodiments of such an apparatus have an advantage in that they enable use of single use valves as well as single use flow path devices as summarized above. The solenoid arrangements may be arranged internally or on an external face of the apparatus. More or less simple attachment means may be arranged to secure the valve or flow path device to the apparatus such that the solenoid arrangements are placed in spatial relation to the valves that enable interaction between magnetic fields provided by the solenoid arrangements and the plunger arrangements. The control circuitry, which is suitably configured, e.g., by an operator, may activate the solenoid arrangements to provide such magnetic fields that interact with the valves as summarized above.

In a fourth aspect, there is provided a method of handling a bioprocess liquid. Such a method comprises mounting a valve according to any embodiment as summarized above in an embodiment of a bioprocess apparatus as summarized above. The method further comprises controlling flow of bioprocess liquid in the apparatus. The control of the flow of bioprocess liquid comprises provision of magnetic fields to a plunger arrangement inside the valve. The valve is then dismounted from the apparatus.

Such a method provides the same effects and advantages as those summarized above in connection with the first, second and third aspects.

DETAILED DESCRIPTION

Figure 1:
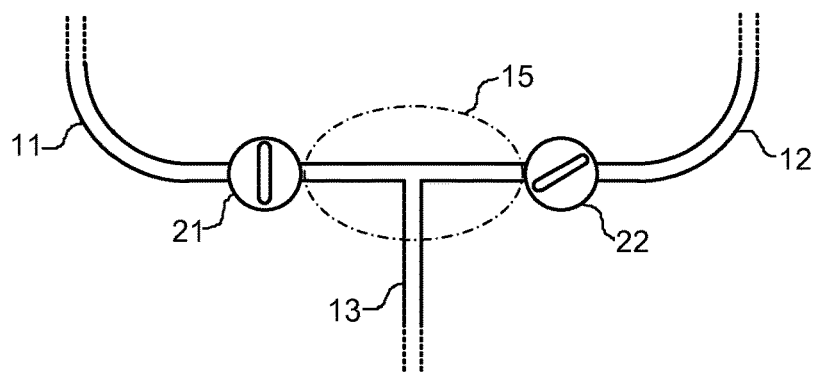
FIG. 1 schematically illustrates a prior art pinch valve arrangement.
Figure 2A:
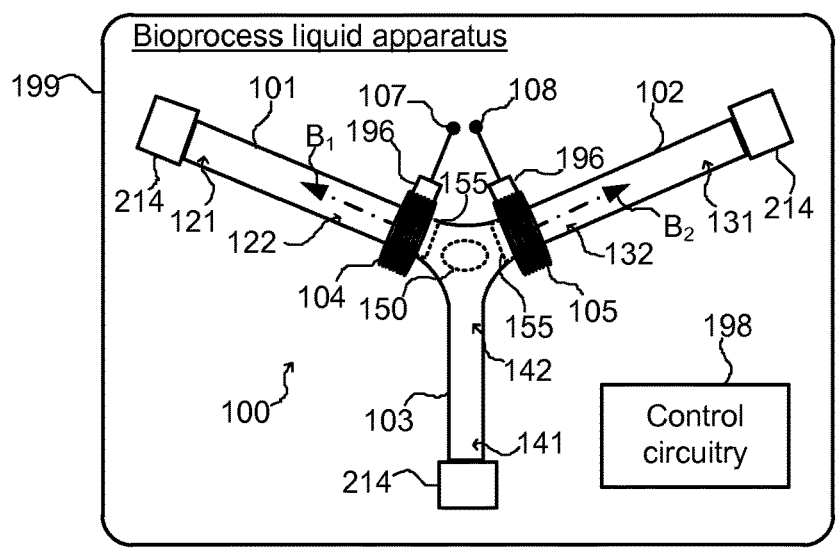
FIG. 2a schematically illustrates a bioprocess liquid apparatus comprising a valve, FIG. 2b schematically illustrates a flow path device comprising a valve, FIG. 3a schematically illustrates a cross-section of a valve, FIG. 3b schematically illustrates a cross-section of a valve, FIGS. 4a and 4b schematically illustrate a respective cross-section of a valve, FIGS. 4c and 4d schematically illustrate a respective cross-section of a valve, FIG. 4e schematically illustrates a cross-section of a valve, FIG. 5 schematically illustrates a cross-section of a valve, FIG. 6 schematically illustrates a cross-section of a valve.

FIG. 2a illustrates schematically a valve 100 that is arranged in a bioprocess liquid apparatus 199. The valve 100 comprises a first tubular section 101, a second tubular section 102 and a third tubular section 103. Each tubular section 101, 102, 103 has a respective first end 121, 131, 141 and a respective second end 122, 132, 142. The tubular sections 101, 102, 103 are joined together at their respective second end 122, 132, 142. Valve seat means 155 are arranged at least at the respective second end 122, 132 inside the first tubular section 101 and inside the second tubular section 102. A plunger arrangement 150 is arranged inside the valve 100 and the plunger arrangement 150 is configured, as will be exemplified below, to selectively interact with the valve seat means 155 to close and open at least the first tubular section 101 and the second tubular section 102 in response to a magnetic field provided by a first solenoid arrangement 104 arranged at the second end 122 of the first tubular section 101 and a magnetic field provided by a second solenoid arrangement 105 arranged at the second end 132 of the second tubular section 102. The respective magnetic fields are schematically indicated by $B_1$ and $B_2$.

The bioprocess liquid apparatus 199 comprises control circuitry 198, the first solenoid arrangement 104 and the second solenoid arrangement 105. Attachment means 196 for the solenoid arrangements 104, 105 are arranged at the apparatus 199 (i.e. the attachment means 196 may form a fixed or removable part of the apparatus 199) such that the solenoid arrangements 104, 105 circumscribe respective second end 122, 132 of the tubular sections 101, 102 when the valve 100 is arranged in the apparatus 199. Connection means 214 for the valve 100 are also schematically illustrated.

The bioprocess liquid apparatus 199 is configured to interact with the valve 100, the interaction comprising provision of magnetic fields to the plunger arrangement 150 inside the valve 100. The interaction with the valve 100 is controlled by the control circuitry 198 providing electric control current via electric connections 107, 108 to the solenoids 104, 105. As the skilled person will realize, such interaction involves software instructions as well as hardware means such as electric power means, pressured tubing, pumps, aseptic connections and actuators.

Although not illustrated in FIG. 2a, a third solenoid arrangement may be arranged at the second end 142 of the third tubular section 103 in a similar manner as that of the first and second solenoid arrangements 104, 105. Embodiments of the bioprocess liquid apparatus 199 comprising such third solenoid arrangement may operate together with a valve as will be described below in connection with FIG. 6.

Figure 7:
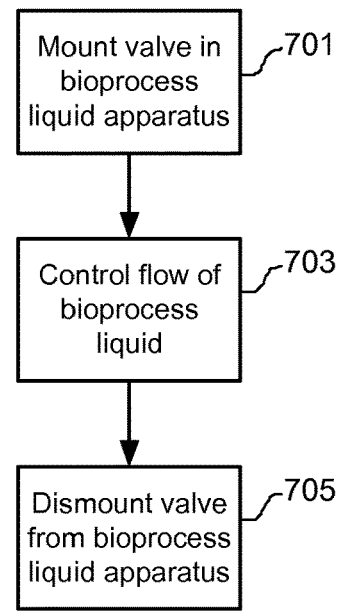
FIG. 7 is a flowchart of a method of handling a bioprocess liquid.

With reference to FIG. 7, and with continued reference to FIG. 2a, a method of handling a bioprocess liquid in the bioprocess liquid apparatus 199 comprises a number of steps or actions as follows:

A valve 100 is mounted in the bioprocess apparatus 199 in a mounting step 701. As indicated above, the mounting step 701 may involve a manual arrangement of the attachment means 196 to circumscribe the tubular sections 101, 102 and thereby fixing the valve 100 to the apparatus 199 such that the solenoids 104, 105 become positioned around the tubular sections 101, 102 and thereby enable interaction between magnetic fields and the plunger arrangement 150 inside the valve 100.

Flow of bioprocess liquid in the apparatus 199 is then controlled in a control step 703. The control step 703 comprises provision of the magnetic fields to the plunger arrangement 150 inside the valve 100. An effect of the control step 703 is that of closing and opening the tubular sections 101, 102 as described herein. The control step 703 typically comprises further detailed procedures, such as various treatment steps associated with the specific bioprocess liquid. However, such procedures are outside the scope of the present disclosure.

Subsequent to the control step 703, the valve 100 is then dismounted, in a dismounting step 705, from the apparatus 199. In a single use context, the valve 100 may finally be discarded, although such an action is not part of the method of handling the bioprocess liquid.

Figure 2B:
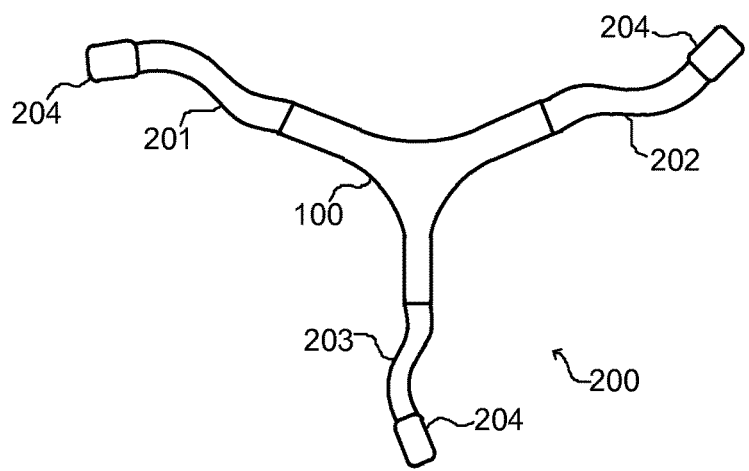

FIG. 2b schematically illustrates a flow path device 200 for a bioprocess liquid. The flow path device 200 comprises a valve 100 and three tubes 201, 202, 203 attached to the valve 100. As illustrated, the tubes 201, 202, 203 may comprise connectors 204 that are configured to connect the flow path device 200 to a bioprocess liquid apparatus such as the apparatus 199 illustrated in FIG. 2a. Any of the tubes 201, 202, 203, the valve 100 and the connectors 204 may be aseptic, e.g. as a result of being pre-sterilized by gamma rays. The flow path device 200 may be provided as a single use device as discussed briefly above in connection with the valve 100. Advantageously, the flow path device 200 may be pre-sterilized, e.g. by gamma ray sterilization. For connection to an apparatus 199 in non-sterile rooms, the connectors 204 may be aseptic connectors, e.g. as described in U.S. Pat. Nos. 3,865,411, 8,454,059, which are hereby incorporated by reference in their entireties. Although flow path device 200 only shows a single valve 100 with three tubes 201, 202, 203, more complex flow path devices are also contemplated. Such flow path devices may comprise several valves 100, which may be interconnected by tubes, e.g. to form a manifold. The flow path devices may also comprise further components such as single use sensors, elastic tubing for peristaltic pumps, single use pump heads, for e.g. membrane or centrifugal pumps etc.

Figure 3A:
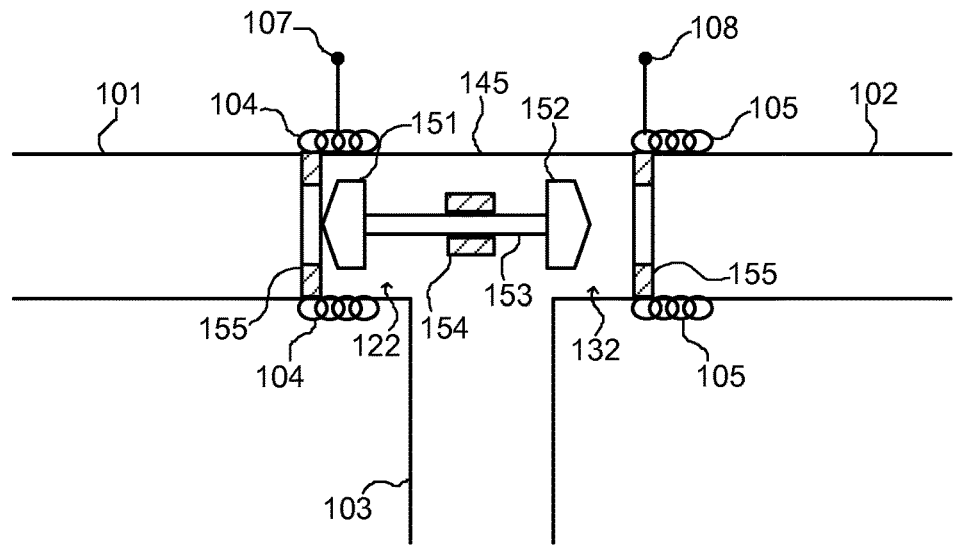
Figure 3B:
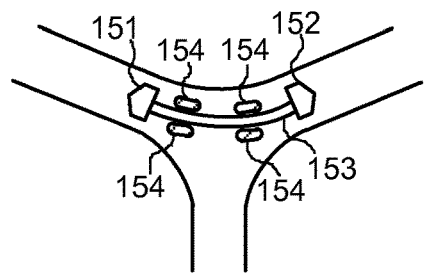

With reference to FIG. 3a and FIG. 3b, and with continued reference to FIG. 2a, the plunger arrangement 150 inside the valve 100 may comprise a first plunger 151 arranged at the second end 122 inside the first tubular section 101 and a second plunger 152 arranged at the second end 132 inside the second tubular section 102. The first plunger 151 and the second plunger 152 are connected with each other via a connecting part 153 and configured such that closure of the first tubular section 101 corresponds to opening of the second tubular section 102. For example, such configuration may involve configuration of the size of the plungers, the length of the connecting part 153 as well as other considerations that may be needed in order to enable movement of the connected plungers 151, 152, such as the arrangement of a guide 154, internal of the valve 100, for the connecting part 153. FIG. 3a exemplifies a linear configuration of the connecting part 153 and FIG. 3b illustrates a curved configuration of the connecting part 153 and the guide 154.

In other embodiments of the valve 100, the plunger arrangement 150 comprises disconnected plungers. FIGS. 4a-d illustrate the first tubular section 101 in embodiments of such a valve 100. (For the sake of clarity, only the first tubular section 101 and the first plunger 161 are illustrated.) In such embodiments, the plunger arrangement 150 comprises a first plunger 161 arranged at the second end 122 inside the first tubular section 101 and a second plunger arranged at the second end 132 inside the second tubular section 102. The first plunger 161 and the second plunger are suspended by respective support means 163 that are arranged inside the valve 100.

Figure 4A:
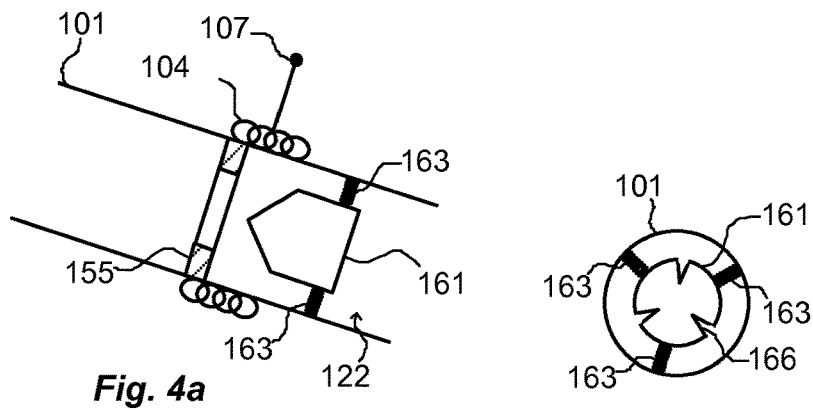
Figure 4B:
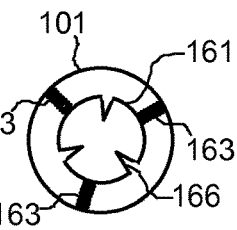
Figure 4C:
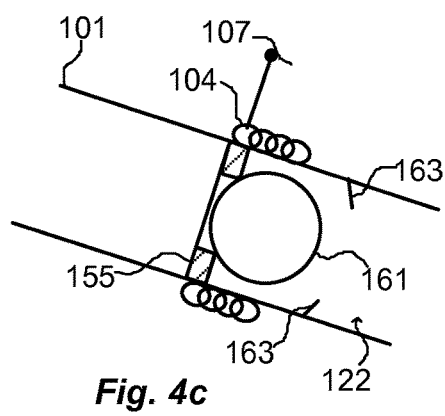
Figure 4D:
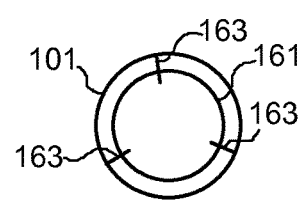

As exemplified, the plunger 161 may have various shapes including a generally cylindrical shape as exemplified in FIGS. 4a and 4b and also being in the form of a ball as exemplified in FIGS. 4c and 4d. A cylindrical shaped plunger 161 may have grooves 166 for facilitating flow of bioprocess liquid inside the valve 100. The support means 163 provide support for the plunger 161 such that the plunger 161 remains at a position within the valve 100 suitably close to the valve seat means 155 such that magnetic fields provided by the solenoid arrangement 104 may force the plunger 161 to close the valve 100.

As illustrated in FIGS. 4a and 4b, the support means 163 may comprise springs that provide a biasing spring force on the plunger 161 either towards or away from the valve seat means 155. When a magnetic field is provided by the solenoid arrangement 104, the biasing force will be overcome and the plunger 161 will be forced away from or towards the valve seat means 155.

Figure 4E:
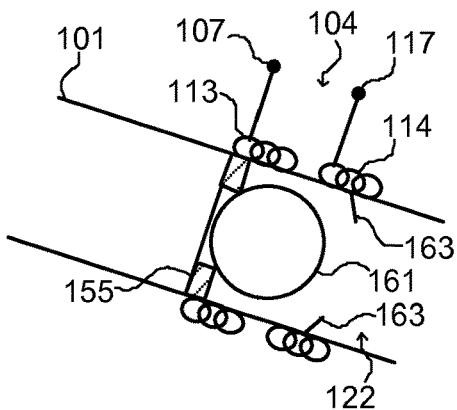

FIG. 4e illustrates schematically an embodiment of the valve 100 where the first solenoid arrangement 104 comprises a double coil arrangement 114. The support means 163 may in such embodiments be fixed and a biasing force on the plunger 161, either towards or away from the valve seat means 155, may be provided by a first coil 113. A second coil 114, when activated, may then provide a force that moves the plunger 161 away from or towards the valve seat means 155. In other words, a double coil arrangement 113, 114 provide a similar effect as that of single coil configurations, as exemplified above, without using spring support means.

Figure 5:
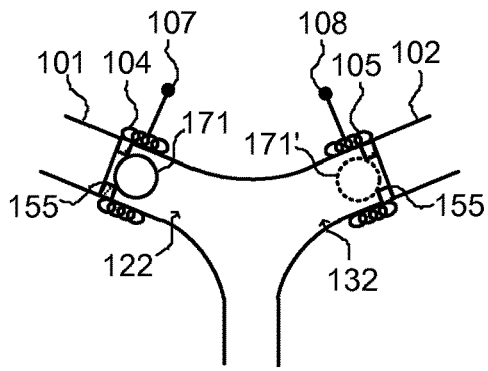

FIG. 5 illustrates schematically embodiments of the valve 100 where the plunger arrangement 150 comprises a single plunger 171 arranged inside the valve 100 such that closure of the first tubular section 101 corresponds to opening of the second tubular section 102. In such embodiments, the single plunger 171 is preferably in the form of a ball and the inside surface of the valve 100 is preferably free from hindering obstacles, as the single plunger 171 moves between the valve seat means 155 in the first tubular section 101 and the valve seat means 155 in the second tubular section 102 as a consequence of magnetic fields provided by the solenoid arrangements 104, 105 at the first and second tubular sections 101, 102, respectively. Reference numeral 171' indicates the position of the plunger 171 at the valve seat means 155 in the second tubular section 102.

Figure 6:
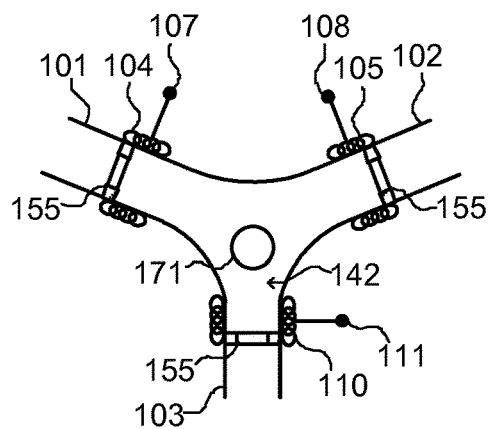

FIG. 6 illustrates schematically embodiments of the valve 100 where the plunger arrangement 150 comprises a single plunger 171 arranged inside the valve 100 and a third solenoid arrangement 110 is arranged at the second end of the third tubular section 103 of the valve 100. In such embodiments, in response to the magnetic field provided by the first solenoid arrangement 104, the magnetic field provided by the second solenoid arrangement 105 and a magnetic field provided by the third solenoid arrangement 110, the single plunger 171 selectively interacts with the valve seat means 155 to close and open the first tubular section 101, the second tubular section 102 and the third tubular section 103. In such embodiments, the valve 100 may operate according to a scenario in which both the first and the second tubular sections 101, 102 are open at the same time. Depending on whether valve seat means 155 are arranged at the third tubular section 103 (as is the case illustrated in FIG. 6), the single plunger 171 may be selectively controlled to be in a position that closes the third tubular section 103 or a more "neutral" position that allows bioprocess liquid flow also in the third tubular section 103.

Although the various embodiments of the valve 100 and the flow path device 200 have been described without reference to the use of any specific materials, bearing in mind that single use and aseptic conditions are preferred, it is a preferred choice to use plastic tubular sections and connectors. The materials suitable for plungers include plastics with a suitable inclusion of ferrite materials for enabling the interaction with the magnetic fields provided by the solenoid arrangements 104, 105, 110.

The invention claimed is:

1. A valve for a bioprocess liquid apparatus, the valve comprising:
   a first tubular section, a second tubular section and a third tubular section, each tubular section having a respective first end and a respective second end, wherein the tubular sections are joined together at their respective second end,
   valve seat means arranged at least at the respective second end inside the first tubular section and inside the second tubular section, and
   a plunger arrangement inside the valve, the plunger arrangement being configured to selectively interact with the valve seat means to close and open at least the first tubular section and the second tubular section in response to a magnetic field provided by a first solenoid arrangement arranged at the second end of the first tubular section and a magnetic field provided by a second solenoid arrangement arranged at the second end of the second tubular section,
   where the plunger arrangement comprises a single plunger arranged inside the valve such that, in response to the magnetic field provided by the first solenoid arrangement, the magnetic field provided by the second solenoid arrangement and a magnetic field provided by a third solenoid arrangement arranged at the second end of the third tubular section, the single plunger selectively interacts with the valve seat means to close and open the first tubular section, the second tubular section and the third tubular section.

2. The valve of claim 1, where the single plunger is arranged inside the valve such that closure of the first tubular section corresponds to opening of the second tubular section.

3. A flow path device for a bioprocess liquid, comprising:
   at least one valve according to claim 1, and
   a plurality of tubes attached to the valve.

4. The flow path device of claim 3, comprising a plurality of connectors configured to connect the flow path device to a bioprocess liquid apparatus.

5. The flow path device of claim 3, where any of the tubes, the at least one valve and the connectors are aseptic.

6. A bioprocess liquid apparatus comprising control circuitry, a first solenoid arrangement and a second solenoid arrangement, the apparatus being configured to interact with a valve as claimed in claim 1, said interaction comprising provision of magnetic fields to the plunger arrangement inside the valve.

7. The bioprocess liquid apparatus of claim 6, comprising a third solenoid arrangement.

8. A method of handling a bioprocess liquid, comprising:
   mounting a valve as claimed claim 1 in a bioprocess apparatus,
   controlling flow of bioprocess liquid in the apparatus, comprising provision of magnetic fields to a plunger arrangement inside the valve, and
   dismounting the valve from the apparatus.

* * * * *